(12) United States Patent
Hannah (10) Patent No.: US 6,191,663 B1
(45) Date of Patent: Feb. 20, 2001

(54) ECHO REDUCTION ON BIT-SERIAL, MULTI-DROP BUS

(75) Inventor: Eric C. Hannah, Pebble Beach, CA (US)

(73) Assignee: Intel Corporation, Santa Clara, CA (US)

(*) Notice: Under 35 U.S.C. 154(b), the term of this patent shall be extended for 0 days.

(21) Appl. No.: 09/219,738

(22) Filed: Dec. 22, 1998

(51) Int. Cl.[7] ............................... H03H 7/40; H03H 11/30
(52) U.S. Cl. .................... 333/17.3; 333/32; 333/124; 326/30; 710/126; 710/129
(58) Field of Search ............................ 370/286; 379/136, 379/142, 247, 263, 267; 333/100, 101, 124, 32, 17.3; 710/126, 129; 326/30

(56) References Cited

U.S. PATENT DOCUMENTS

| | | | |
|---|---|---|---|
| 4,719,369 | 1/1988 | Asano et al. | 307/443 |
| 5,448,591 | 9/1995 | Goodrich | 375/257 |
| 5,596,285 | 1/1997 | Marbot et al. | 326/30 |
| 5,621,335 | 4/1997 | Andresen | 326/30 |
| 5,784,581 | 7/1998 | Hannah | 710/110 |
| 5,789,937 | 8/1998 | Coa et al. | 326/30 |

FOREIGN PATENT DOCUMENTS 0848333   6/1998   (EP)   ............................... G06F/13/40

OTHER PUBLICATIONS

"ANSi X3.298–1997, At attachment—3 Interface (ATA–3)", *American National Standards Institute*, Copyright by Information Technology Industry Council (ITI), Entire Book (149 pgs, 1998 © Approved Sep. 30, 1997.

"IEEE Standard for A High Performance Serial Bus", *IEEE Std 1394–1995*, Copyright by the Institute of Electrical and Electronics Engineers, Inc., Entire Book (372 pgs, (Aug. 30, 1996).

"Universal Serial Bus Specification", Copyright, Compaq Computer Corporation Revision 1.1, 312 Pages, (Sep. 23, 1998).

*Primary Examiner*—Benny Lee
*Assistant Examiner*—Stephen E. Jones
(74) *Attorney, Agent, or Firm*—Schwegman, Lundberg, Woessner & Kluth, P.A.

(57) ABSTRACT

Methods of active echo reduction on a multi-drop bus utilizing devices of dynamically-variable impedance, wherein non-signaling intermediate devices are placed in a high-impedance state while all remaining devices are matched to the characteristic impedance of the multi-drop bus. Devices of dynamically-variable impedance capable of implementing methods of active echo reduction on a multi-drop bus are included, as well as systems incorporating such devices.

15 Claims, 8 Drawing Sheets

ECHO REDUCTION ON BIT-SERIAL, MULTI-DROP BUS

TECHNICAL FIELD

The invention relates generally to input/output (I/O) architecture, and more specifically to active echo reduction on a bit-serial, multi-drop I/O bus architecture.

BACKGROUND INFORMATION

Personal computers are in widespread use throughout the world. Most personal computers contain some form of internal block storage device, such as one or more hard drives, CD-ROM drives, CD recorders, tape drives and data cartridge drives, and various other I/O devices which may include some form of programmable memory array. These I/O devices communicate with the internal chipset of the personal computer through a data communication channel, or bus.

With the rapid advancement in processor speed, data communication speed becomes increasingly important. This is especially true where large amounts of information are passed between the personal computer and the I/O device as is common with block storage devices.

High speed, bit-serial I/O is an economical architecture for future personal computers. By using a differential signal on two chip pins, current CMOS (complementary metal-oxide semiconductor) technology can send signals at data rates up to several gigabits per second.

Existing bit-serial I/O standards such as Universal Serial Bus (USB) Specification, Revision 1.1 (dated Sep. 23, 1998), and the Institute of Electrical and Electronics Engineers, Inc. (IEEE) Standard 1394–1995 for a High Performance Serial Bus (approved Dec. 12, 1995 by the IEEE Standards Board and Jul. 22, 1996 by the American National Standards Institute), assume point-to-point wiring. There are two common approaches to such point-to-point wiring.

Figure 1:
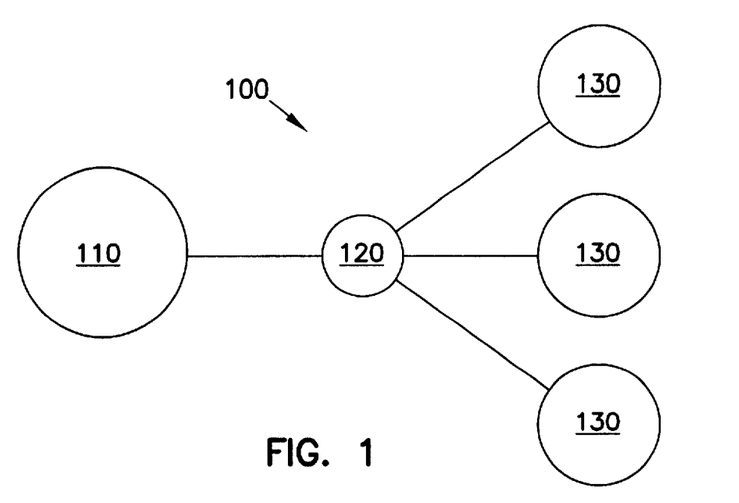
FIG. 1 is a block diagram of a star bus architecture.

The first approach is a star bus architecture, with a central hub coupled to and supporting multiple devices. In a star bus architecture, each device communicates only through the hub to the master controller. FIG. 1 is an example of a star bus architecture I/O system 100 having a chipset 110 coupled to a hub 120. Hub 120 is coupled to multiple I/O devices 130, thus allowing communication between the chipset 110, as a master device, and each I/O device 130, as a slave device.

Figure 2:
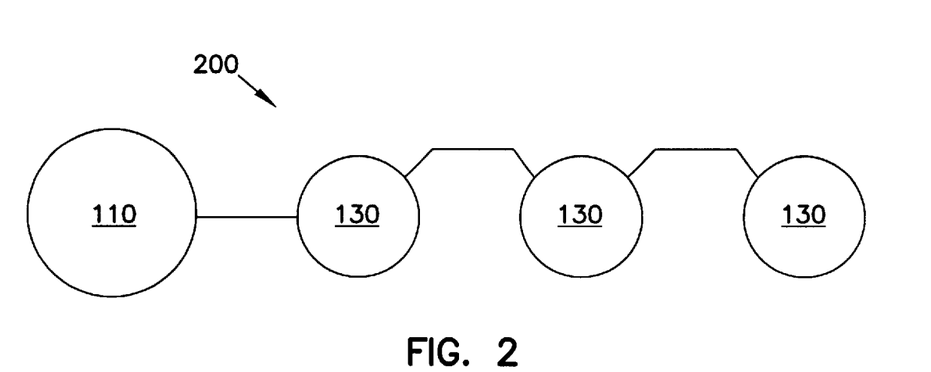
FIG. 2 is a block diagram of a daisy-chain bus architecture.

The second approach is a daisy-chain bus architecture. In a daisy-chain bus architecture, multiple devices are coupled in series with each device transmitting to, or receiving from, a neighboring device. Communication from one end of a daisy-chain bus architecture to the other commonly involves an approach in which each device relays communications to the next device in the chain. To accomplish this, each device has at least two I/O ports combined with the circuitry to regenerate the incoming signals on the outgoing I/O port. FIG. 2 is an example of a daisy-chain bus architecture I/O system 200 having a chipset 110, as a master device, coupled to multiple I/O devices 130, as slave devices.

Perhaps the most common interface between a personal computer and its block storage devices is the AT Attachment (ATA) interface. The ATA interface has been standardized, in its various renderings, by the American National Standards Institute (ANSI). See, e.g., ANSI X3.298–1997, AT Attachment-3 Interface (ATA-3), approved Sep. 30, 1997. ATA is commonly referred to as IDE (Integrated Device Electronics), referring to the integration of controllers into disk drives, as ATA adopted the IDE technology. The ATA standards define the connectors and cables for physical interconnection between a host system and its internal block storage device, as well as the electrical and logical characteristics of the interconnecting signals. The ATA standards utilize a daisy-chain approach to point-to-point wiring.

Figure 3:
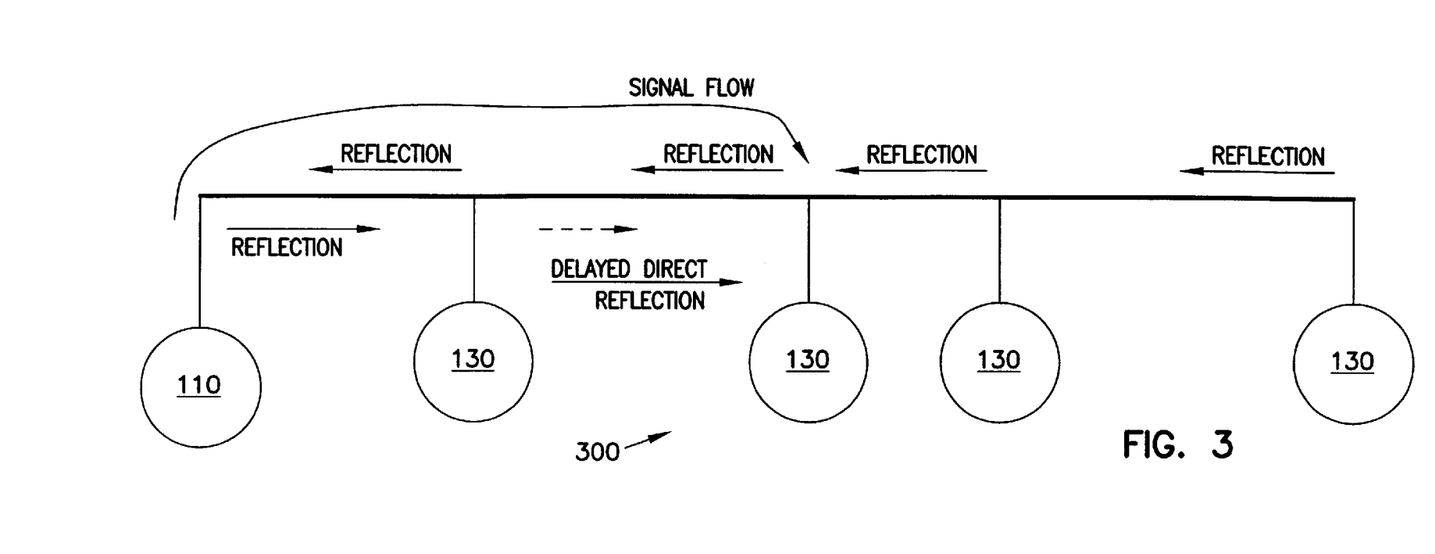
FIG. 3 is a block diagram of a multi-drop bus architecture.

Both star bus architecture and daisy-chain bus architecture add cost and complexity to the basic bus architecture through the use of a central hub or multiple I/O ports. An alternative to point-to-point wiring is the use of a multi-drop bus architecture. In a multi-drop bus architecture, a master device can control communications by addressing one or more slave devices across a bus. As such, multi-drop bus architecture commonly use one I/O port for each coupled device. FIG. 3 is an example of a multi-drop bus architecture I/O system 300 having a chipset 110, as a master device, coupled to multiple I/O devices 130, as slave devices.

While the multi-drop bus architecture reduces the cost and complexity associated with point-to-point wiring, multi-drop bus architecture is prone to signal reflections, or echos. This occurs because each cable connection between the bus and a non-receiving device represents a discontinuity for signal energy, thus causing reflections and/or phase-shifted transmissions on the bus. The signal may be reflected back and forth multiple times, causing an oscillatory behavior on the bus, commonly known as "ringing." Such ringing results in reduced noise immunity, thus leading to reduced signal integrity and reduced operating speeds.

To reduce ringing, the I/O driver circuits for devices attached to a multi-drop bus architecture are often adjusted to match their impedance to the characteristic impedance of the bus. While the impedance of the I/O driver circuit can be adjusted manually, it is common that the I/O driver circuits contain self-adjusting circuitry. Even with impedance matching, multi-drop buses may experience significant reflections.

As will be seen from the above concerns, there exists a need for an improved high-speed bit-serial I/O protocol for coupling I/O devices to a processor, such as an internal chipset of a personal computer. The above mentioned problems with signal reflections and other problems are addressed by the present invention and will be understood by reading and studying the following specification.

SUMMARY

One embodiment of the invention provides a method of active echo reduction on a multi-drop bus having a plurality of I/O devices. The method includes determining whether an I/O device is an intermediate device, determining whether an I/O device is in a non-signaling status, and adjusting an impedance of the I/O device to a high-impedance state when the I/O device is an intermediate device in a non-signaling status.

Another embodiment of the invention provides an I/O device. The I/O device includes an I/O port suitable for coupling to a multi-drop bus and an I/O driver circuit having an impedance and coupled to the I/O port. The I/O driver circuit is adapted to selectively adjust its impedance to a high-impedance state when the I/O device is a non-signaling intermediate device.

A further embodiment of the invention provides a system. The system includes a processor, a multi-drop bus coupled to the processor, and a plurality of I/O devices coupled to the multi-drop bus. Each of the plurality of I/O devices comprises an I/O port coupling the I/O device to the multi-drop bus and an I/O driver circuit having an impedance and coupled to the I/O port. The I/O driver circuit is adapted to selectively adjust its impedance to a high-impedance state when the I/O device is a non-signaling intermediate device.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense, and the scope of the invention is defined by the appended claims. Like numbers in the figures refer to like components, which should be apparent from the context of use.

The detailed description is written in the context of a bus architecture and I/O devices for use in a personal computer. As used herein, I/O or input/output describes an act of, ability for or facilitating of communication across a bus, comprising transmitting output across a bus, receiving input across a bus or both transmitting output and receiving input across a bus. There is no limitation that an input/output device be capable of two-way communication of information across the bus.

It will be apparent to those of ordinary skill in the art that the invention is applicable to other networks of electronic devices communicating across a common bus. Furthermore, the detailed description is written in the context of an I/O system having one master, e.g., a personal computer internal chipset, and four slaves, e.g., I/O devices, as a matter of convenience. There is no limitation inherent in the invention as to the type of master device, or the type or number of slave devices coupled to the bus, nor their relative spacing on the bus. As will be seen from the description, an I/O device may even be disconnected from the bus without adverse effect, as this is analogous to a high-impedance state.

Figure 4:
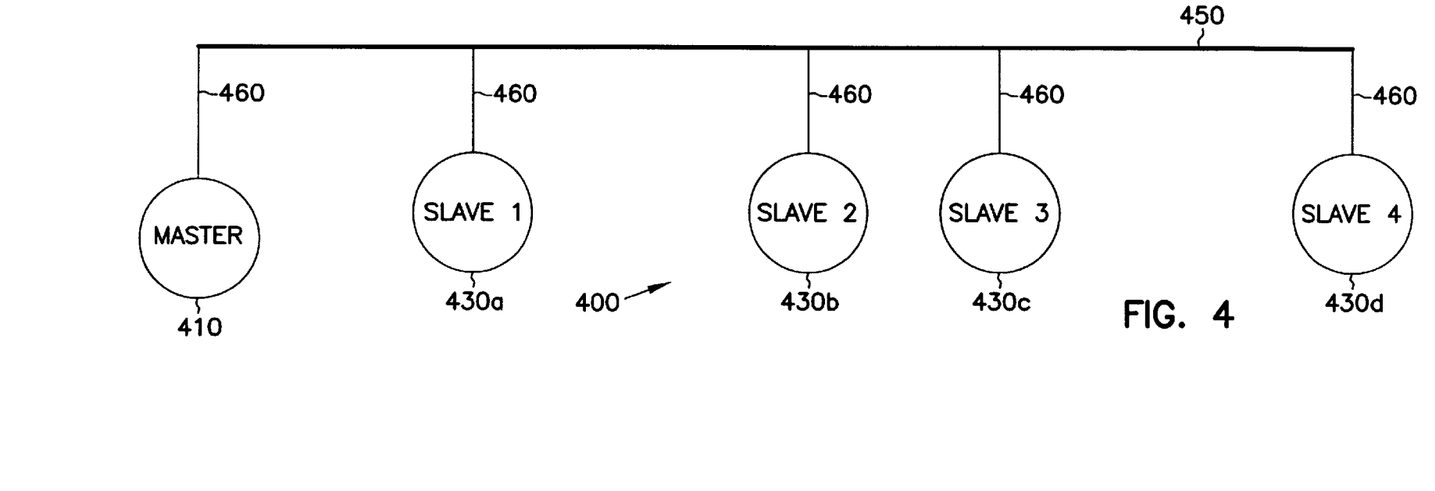
FIG. 4 is a schematic of an I/O system for use with various embodiments of the invention.

FIG. 4 is a schematic representation of one embodiment of a multi-drop bus architecture I/O system 400 for use with the invention. I/O system 400 has one master device 410 and four slave devices 430a, 430b, 430c and 430d coupled to the multi-drop bus 450 through drops 460. Drops 460 are the physical connections coupling the various devices 410, 430a, 430b, 430c and 430d to bus 450. Bus 450 is an example of a multi-drop bus, having multiple drops 460 connecting devices to the bus.

Bus 450 will have a characteristic impedance, $Z_0$. For purposes of the example embodiments, $Z_0$ will be assumed to be 50 Ω. However, the invention is suitable to buses of any characteristic impedance. Furthermore, the characteristic impedance of a bus may be variable with time. Changing values of $Z_0$ merely affect the calculations and not the concept of the invention.

A one-volt incident, or generated signal, will be presumed from master device 410. Again, changing values of the signal amplitude merely affect the calculations and not the concept of the invention.

Figure 5:
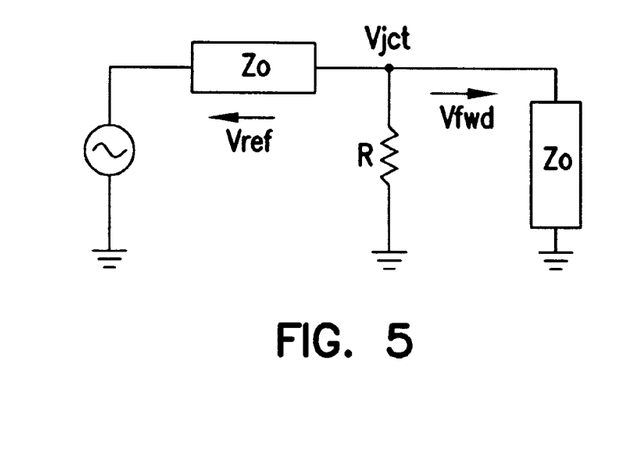
FIG. 5 is a Thevenin Equivalent circuit model for calculating reflected and transmitted energies.

Designers have typically chosen to use matched loads all along a bus to reduce the sum of reflected and transmitted energy of each device, or node. FIG. 5 shows the model for calculating reflected and transmitted amplitudes. FIG. 5 is a Thevenin Equivalent circuit 500 for producing the one-volt incident. The model is governed by the following equations:

Eq. 1: $Z_L = \dfrac{RZ_o}{R + Z_o}$

Eq. 2: $V_{jct} = \dfrac{2Z_L}{Z_L + Z_o}$

Eq. 3: $V_{Ref} = 1 - V_{jct}$

Eq. 4: $V_{Fwd} = V_{jct}$

Where $V_{Ref}$ is the reflected amplitude and $V_{Fwd}$ is the transmitted amplitude. The net flow of energy in the circuit 500 after absorption inside resistor, R, is:

Eq. 5: Energy $= V_{Ref}^2 + V_{Fwd}^2 = \dfrac{4R^2 + Z_o^2}{(2R + Z_o)^2}$

Equation 5 is a minimum for $R = Z_0/2$. Thus, for devices not at an end of the bus, i.e., intermediate devices, a device is a matched load if its impedance is $Z_0/2$. Devices at an end of the bus, i.e., end-point devices, are not being driven by two paralleled transmission lines, thus end-point devices have an impedance of $Z_0$ to reduce reflections. Accordingly, a device is defined as being optimally matched to the characteristic impedance of the multi-drop bus if it has an impedance of half of the characteristic impedance when it is an intermediate device and an impedance of equal to the characteristic impedance when it is an end-point device.

SPICE (Simulation Program for Integrated Circuits Emphasis) circuit models will be used to demonstrate the concepts involved in the invention. SPICE is a general purpose analog circuit simulator that is used to verify circuit designs and to predict circuit behavior. SPICE was originally developed at the Electronics Research Laboratory of the University of California, Berkeley in 1975 and is well known and accepted in the art for the purpose of predicting circuit behavior.

Three examples will be depicted with reference to the I/O system 400 of FIG. 4. Each example assumes desired transmission from the master device 410 to slave device 430*b*. The involvement of a device in communication is referred to herein as its status. Status is either signaling or non-signaling. Thus, master device 410 and slave device 430*b* are signaling devices as they are actively involved in communication across the multi-drop bus 450. All remaining devices, i.e., slave devices 430*a*, 430*c* and 430*d*, are non-signaling devices.

The location of a device determines its type. Type is either an intermediate device or an end-point device. Based upon location along the multi-drop bus 450, master device 410 and slave device 430*d* are end-point devices. Likewise, slave devices 430*a*, 430*b* and 430*c* are intermediate devices as they are each located at an intermediate location between the ends of the bus.

Figure 6:
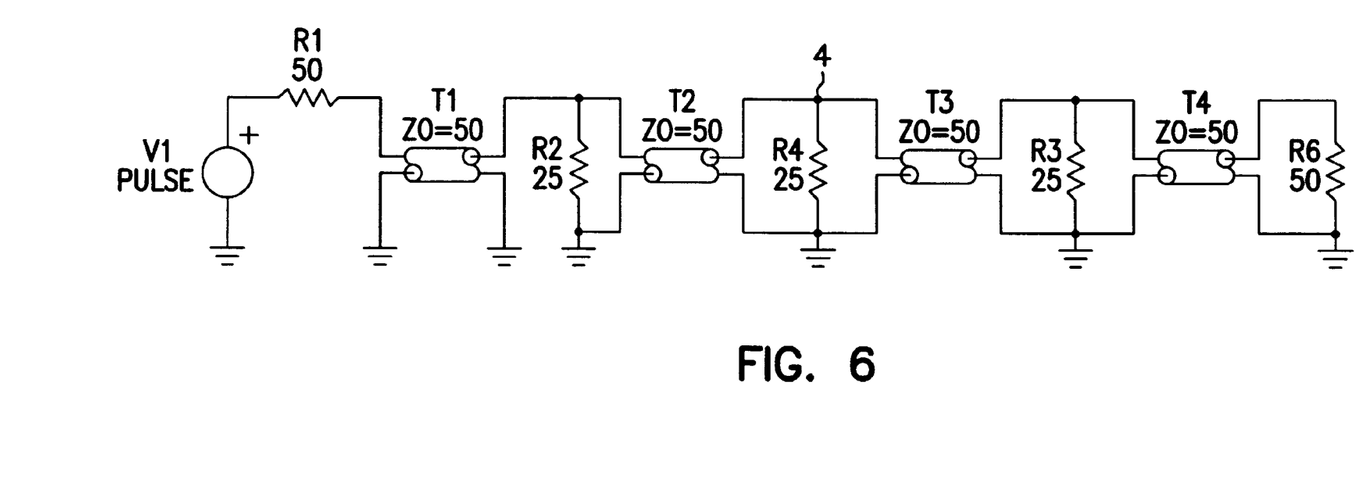
FIG. 6 is a SPICE circuit model of the I/O system of FIG. 4 where the impedance of each device is matched to the characteristic impedance of the bus.

FIG. 6 is a SPICE circuit model of the I/O system 400 of FIG. 4, where the impedance of each device is matched to the characteristic impedance of the bus 450. Accordingly, slave devices 430*a*, 430*b* and 430*c* are modeled with resistors R2, R4 and R3, respectively, each set at a value of $Z_0/2$. Thus, R2, R4 and R3 have values of 25 Ω in this example. Master device 410 and slave device 430*d* are modeled with resistors R1 and R6, respectively. As R1 and R6 are modeling end-point devices, they are each set at a value of $Z_0$, or 50 BΩ. This is a common design approach. However, this approach suffers inherent difficulties.

Figure 7:
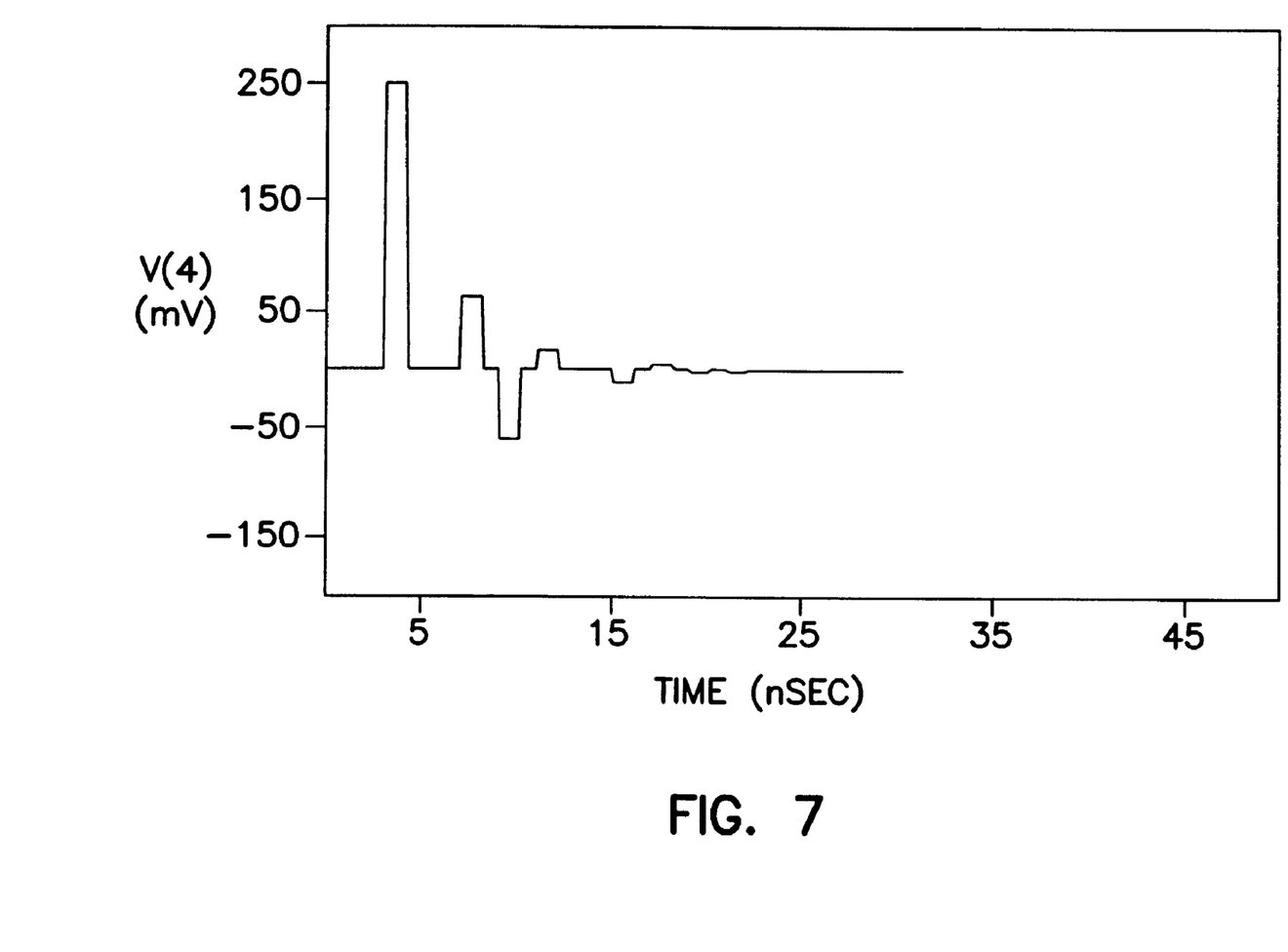
FIG. 7 is a plot of a received signal in accordance with the model of FIG. 6.

FIG. 7 is a plot of the received signal at slave device 430*b*. Slave device 430*b* is represented as node 4 in FIG. 6. In accordance with the Equations 1–4 governing the circuit 500 of FIG. 5, each intermediate slave device, i.e., 430*a*, 430*b* and 430*c*, will reduce the transmitted signal amplitude by half when the resistance is set to half of the characteristic impedance. As shown in FIG. 7, for a one-volt incident, the received signal at node 4 will have a maximum value of 250 mV and be accompanied by significant reflections.

Figure 8:
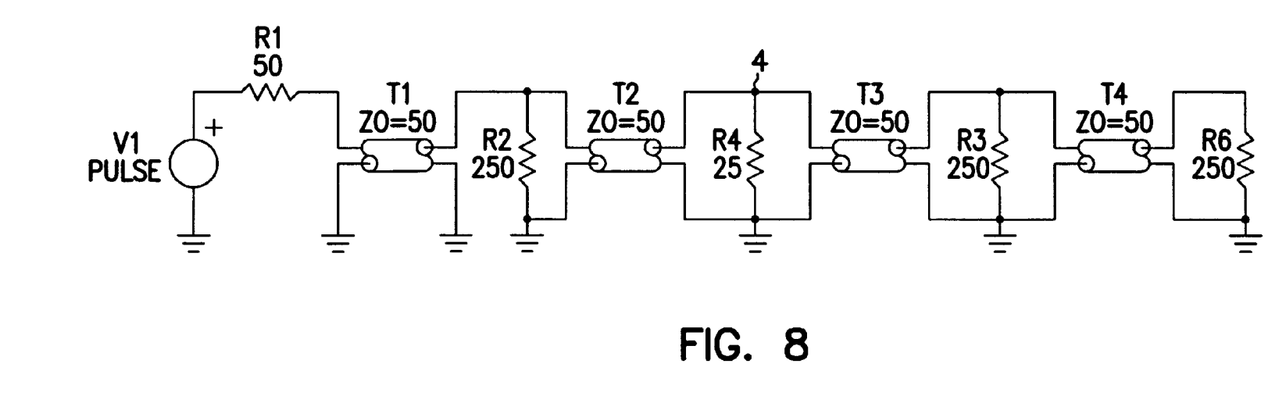
FIG. 8 is a SPICE circuit model of the I/O system of FIG. 4 where the impedance of each signaling device is matched to the characteristic impedance of the bus.

An improvement to the model of FIG. 6 can be obtained by matching only the signaling devices. FIG. 8 is a SPICE circuit model of the I/O system 400 of FIG. 4, where the receiving device, i.e., slave device 430*b*, as well as the transmitting device, i.e., master device 410, are matched loads. Accordingly, the value of R4 is set at $Z_0/2$, or 25 Ω, while the value of R1 is set at $Z_0$, or 50 Ω. The non-signaling devices, i.e., slave devices 430*a*, 430*c* and 430*d*, are placed in a high-impedance state, i.e., tri-stated off. Accordingly, the corresponding resistors R2, R3 and R6 are set at $5Z_0$, or 250 Ω, to approximate a floating capacitor for the simulation.

Figure 9:
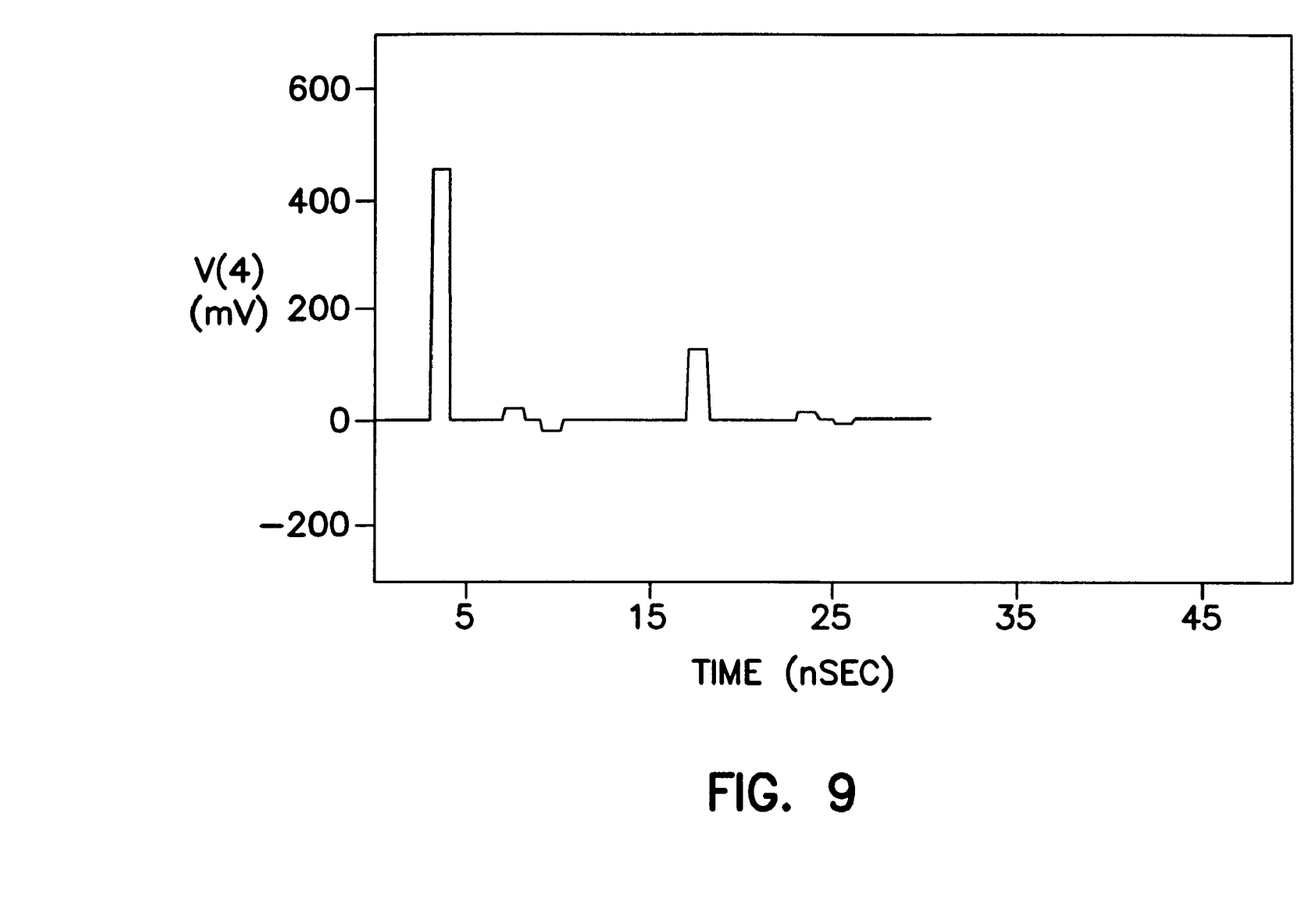
FIG. 9 is a plot of a received signal in accordance with the model of FIG. 8.

FIG. 9 is a plot of the received signal at slave device 430*b*. Slave device 430*b* is represented as node 4 in FIG. 8. With R2 approximating a floating capacitor, the transmitted signal will see little reduction by slave device 430*a*. While this approach improves the maximum signal amplitude received at node 4 to a value in excess of 450 mV, the received signal is still accompanied by significant reflections.

Figure 10:
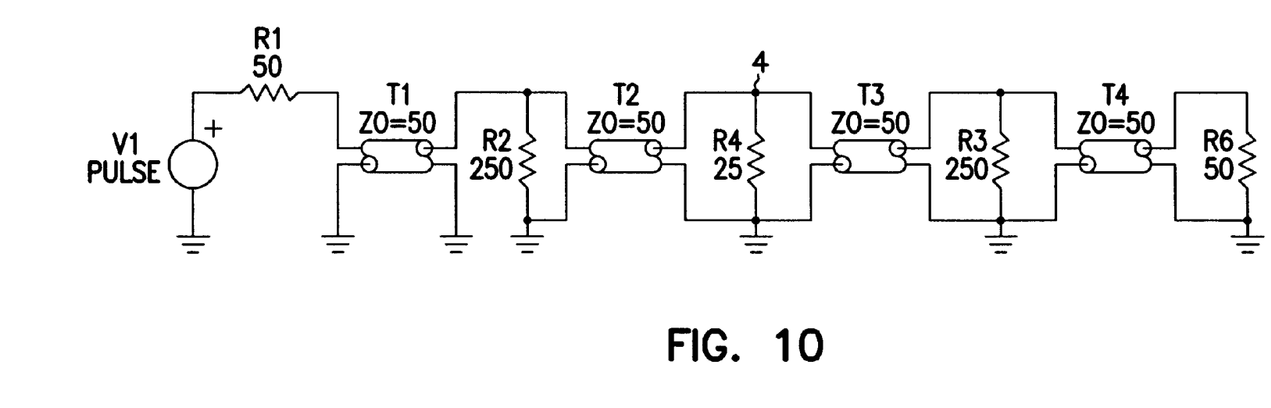
FIG. 10 is a SPICE circuit model of the I/O system of FIG. 4 where the impedance of each signaling device and each end-point device is matched to the characteristic impedance of the bus.

A further improvement to the model of FIG. 8 can be obtained. Those devices that are actively involved in sending or receiving signals, i.e., signaling devices, are optimally matched to the bit-serial wires to absorb energy. The end-point devices maintain a good match to the characteristic impedance of the multi-drop bus, whether signaling or not signaling, to reduce reflections. Remaining devices are placed in a high-impedance state. FIG. 10 depicts such a system.

FIG. 10 is a SPICE circuit model of the I/O system 400 of FIG. 4, where the receiving device, i.e., slave device 430*b*, the transmitting device, i.e., master device 410, and the end-point devices, i.e., master device 410 and slave device 430*d*, are matched loads. Accordingly, the value of R4 is set at $Z_0/2$, or 25 Ω, and the values of R1 and R6 are each set at $Z_0$, or 50 Ω. The remaining non-signaling devices, i.e., slave devices 430*a* and 430*c*, are placed in a high-impedance state, i.e., tri-stated off. Accordingly, the corresponding resistors R2 and R3 are set at $5Z_0$, or 250 Ω, to approximate a floating capacitor for the simulation.

Figure 11:
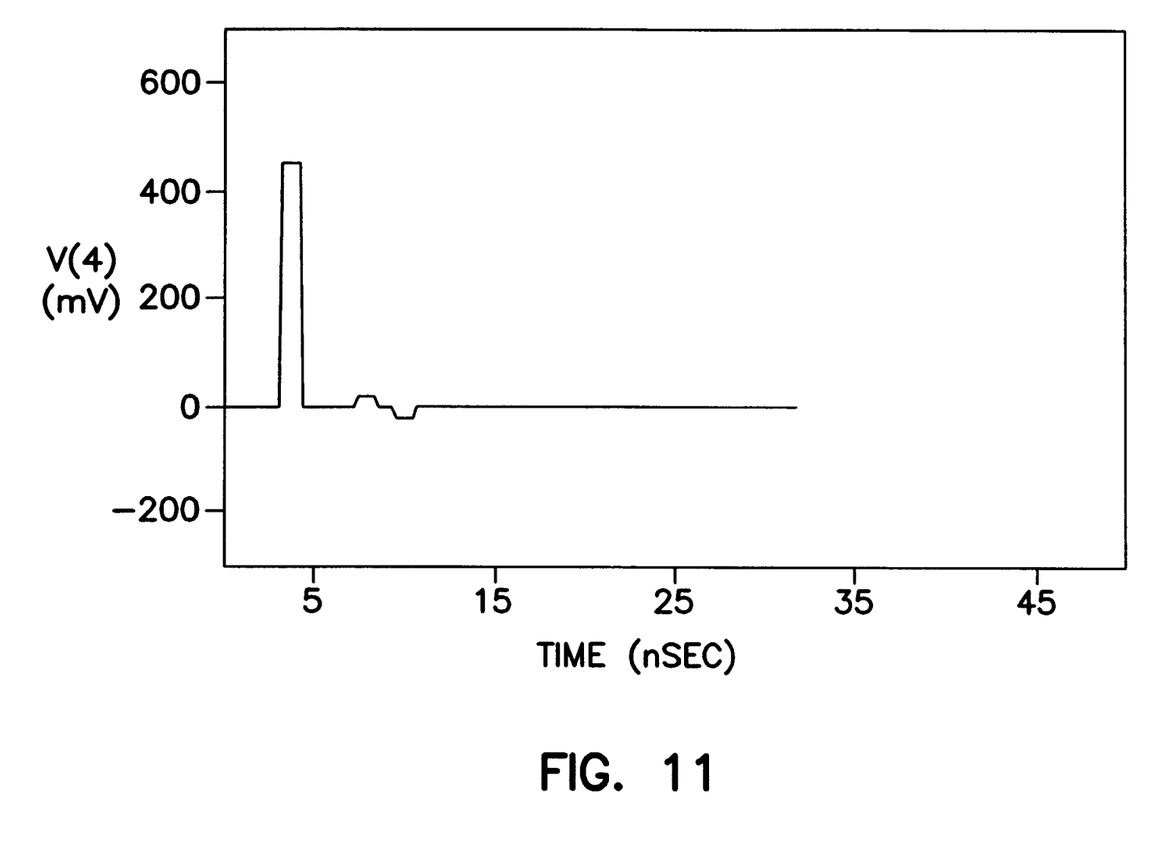
FIG. 11 is a plot of a received signal in accordance with the model of FIG. 10.

FIG. 11 is a plot of the received signal at slave device 430*b*. Slave device 430*b* is represented as node 4 in FIG. 10. With R2 approximating a floating capacitor, the transmitted signal will see little reduction by slave device 430*a*. In addition, by matching slave device 430*d* to the characteristic impedance, its signal reflections are reduced. The model of FIG. 10 thus maintains the improved maximum signal amplitude achieved in the model of FIG. 8, in excess of 450 mV, and further reduces signal reflection magnitude and oscillation. With such an improved signal-to-noise ratio, this embodiment of the invention is capable of increased data communication speeds.

To implement the bus architecture of the embodiment modeled in FIG. 10, each I/O device coupled to the multi-drop bus should be capable of matching its impedance to the characteristic impedance of the multi-drop bus. Numerous adaptations of I/O driver circuits capable of matching impedance are known in the art. See, e.g., U.S. Pat. No. 5,789, 937 issued Aug. 4, 1998 to Cao et al., U.S. Pat. No. 5,621,335 issued Apr. 15, 1997 to Andresen, U.S. Pat. No. 5,596,285 issued Jan. 21, 1997 to Marbot et al., and U.S. Pat. No. 4,719,369 issued Jan. 12, 1988 to Asano et al. Each I/O device coupled to the multi-drop bus also has a configuration circuit coupled to the I/O driver circuit, wherein the configuration circuit is adapted to cause the I/O driver circuit to implement impedance matching in response to the type of the device as well as its status. Accordingly, the configuration circuit is adapted to cause the I/O driver circuit to adjust its impedance to approximately half of the characteristic impedance of a multi-drop bus when the I/O device is a signaling device and the I/O device is configured as an intermediate device. The configuration circuit further is adapted to cause the I/O driver circuit to adjust its impedance to approximately equal to the characteristic impedance of the multi-drop bus when the I/O device is configured as an end-point device. When an intermediate I/O device is a non-signaling device, the configuration circuit is adapted to cause the I/O driver circuit to adjust its impedance to a high-impedance state, i.e., tri-stated off.

It is noted that while it is desirable that all intermediate devices be capable of selectively adjusting impedance based on status and type, devices incapable of such selective adjustment, i.e., fixed-impedance devices, may be coupled to the multi-drop bus. Existence of one or more fixed-impedance devices will impart reflections on the multi-drop bus, in excess of a device capable of selective adjustment, when such fixed-impedance devices are non-signaling intermediate devices. However, a multi-drop bus containing at least one intermediate device capable of selective adjustment of impedance will allow improved signal-to-noise characteristics during communications across the multi-drop bus.

As used herein, a device has fixed impedance if it does not enter a high-impedance state during a non-signaling status when it is an intermediate device. Accordingly, fixed impedance does not connote an absolute and constant impedance. It should be apparent that a fixed-impedance device is suitable for use as an end-point device without detrimental effect as end-point devices are matched to the characteristic impedance of the bus regardless of status.

Figure 12:
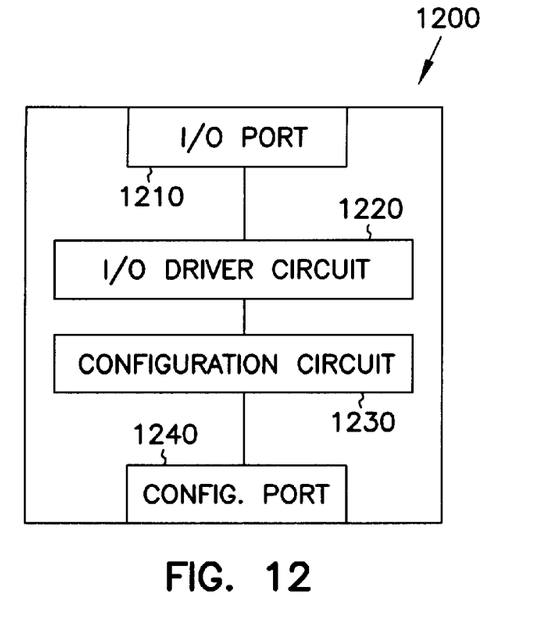
FIG. 12 is a schematic of one embodiment of an I/O device in accordance with the invention.

FIG. 12 is a schematic of one embodiment of an I/O device 1200 for use with a multi-drop bus in accordance with the invention. I/O device 1200 has an I/O port 1210, an I/O driver circuit 1220 and a configuration circuit 1230. I/O device 1200 is capable of coupling to a multi-drop bus (not shown) through I/O port 1210. I/O driver circuit 1220 is coupled to I/O port 1210 to facilitate communication through the multi-drop bus. Configuration circuit 1230 is coupled to I/O driver circuit 1230. While configuration circuit 1230 is shown as separate from I/O driver circuit 1220 in FIG. 12, configuration circuit 1230 may be a portion of I/O driver circuit 1220. Configuration circuit 1230 is adapted to accept configuration data, such as device position along the bus and target impedance if not in a high-impedance state. Configuration data may be provided to configuration circuit 1230 through I/O port 1210 or through an optional separate configuration port 1240. Configuration port 1240 might be user-selectable dip switches or some other user-programmable interface.

Figure 13:
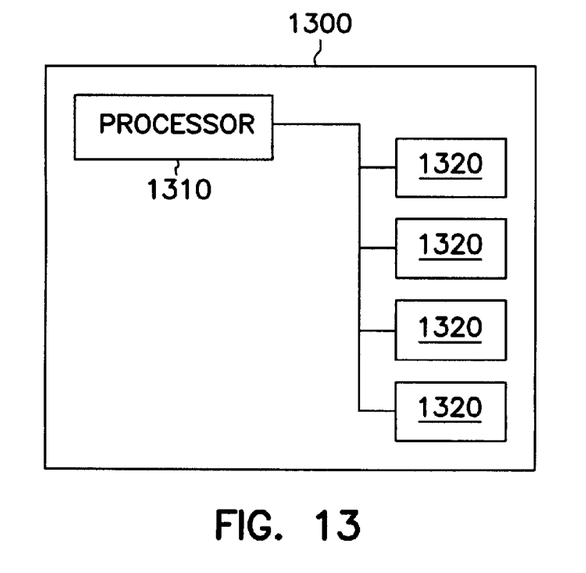
FIG. 13 is a schematic of one embodiment of a computer system containing I/O devices in accordance with one embodiment of the invention.

FIG. 13 is a schematic of one embodiment of a computer system 1300 incorporating a multi-drop bus in accordance with the invention. Computer system 1300 contains a processor 1310, a multi-drop bus 1330 coupled to the processor 1310 and I/O devices 1320 coupled to the multi-drop bus 1330. In this embodiment, processor 1310 controls communications with I/O devices 1320 and is thus a master device. Processor 1310 communicates with only one I/O device 1320 at a time. Accordingly, when any one I/O device 1320 is communicating to or from processor 1310, all remaining I/O devices 1320 are non-signaling devices in this embodiment.

In this embodiment, processor 1310 is always a signaling device. However, I/O devices 1320 may contain a separate processor and the capability to become master devices, in which case processor 1310 could become a non-signaling device.

Embodiments of methods of active echo reduction on a multi-drop bus in accordance with one invention have been described. Devices of dynamically-variable impedance in accordance with the invention capable of implementing such methods of active echo reduction on a multi-drop bus have been described, as well as systems in accordance with the invention incorporating such devices. Although specific embodiments have been illustrated and described herein, it will be appreciated by those of ordinary skill in the art that any arrangement which is calculated to achieve the same or similar purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method of active echo reduction on a multi-drop bus having a plurality of input/output devices, comprising:
   determining which of the plurality of input/output devices are intermediate devices;
   determining which of the plurality of input/output devices are in a non-signaling status; and
   adjusting an impedance of an input/output device to a high-impedance state when the input/output device is an intermediate device in a non-signaling status.

2. The method of claim 1, further comprising:
   matching the impedance of the input/output device to a characteristic impedance of the multi-drop bus when the input/output device is an intermediate device in a signaling status.

3. The method of claim 1, further comprising:
   determining which of the plurality of input/output devices are end-point devices; and
   matching the impedance of the input/output device to a characteristic impedance of the multi-drop bus when the input/output device is an end-point device.

4. A method of active echo reduction on a multi-drop bus having a plurality of input/output devices, comprising:
   determining a status and a type of each of the plurality of input/output devices, wherein the status of each of the plurality of input/output devices is selected from the group consisting of signaling and non-signaling, further wherein the type of each of the plurality of input/output devices is selected from the group consisting of intermediate device and end-point device;
   matching an impedance of each end-point device and each signaling device to a characteristic impedance of the multi-drop bus; and
   placing each non-signaling intermediate device in a high-impedance state.

5. The method of claim 4, wherein matching an impedance comprises adjusting the impedance to approximately half of the characteristic impedance of the multi-drop bus when the input/output device is an intermediate device.

6. The method of claim 4, wherein matching an impedance comprises adjusting the impedance to approximately equal to the characteristic impedance of the multi-drop bus when the input/output device is an end-point device.

7. A method of active echo reduction on a multi-drop bus having a master device and at least two slave devices, comprising:
   determining which of the at least two slave devices is a signaling device, wherein all remaining slave devices are non-signaling devices;
   determining a type of each at least two slave devices, wherein the type is selected from the group consisting of intermediate device and end-point device;
   adjusting an impedance of the signaling device to approximately half of a characteristic impedance of the multi-drop bus when the signaling device is an intermediate device;
   adjusting an impedance of each end-point device to approximately equal to the characteristic impedance of the multi-drop bus; and
   placing each non-signaling intermediate device in a high-impedance state.

8. A system, comprising:
   a processor;
   a multi-drop bus coupled to the processor; and
   a plurality of input/output devices coupled to the multi-drop bus, wherein each of the plurality of input/output devices comprises:
      an input/output port suitable for coupling to a multi-drop bus; and
      an input/output driver circuit having an impedance and coupled to the input/output port, wherein the input/output driver circuit selectively adjusts its impedance to a high-impedance state when the input/output device is a non-signaling intermediate device.

9. The system of claim 8, wherein the input/output driver circuit is adapted to selectively adjust its impedance to approximately half of the characteristic impedance of the multi-drop bus when the input/output device is a signaling intermediate device.

10. The system of claim 8, wherein the input/output driver circuit is adapted to selectively adjust its impedance to approximately equal to the characteristic impedance of the multi-drop bus when the input/output device is an end-point device.

11. The system of claim 8, further comprising a fixed-impedance input/output device coupled to the multi-drop bus.

12. An input/output device, comprising:

an input/output port suitable for coupling to a multi-drop bus; and an input/output driver circuit having an impedance and coupled to the input/output port, wherein the input/output driver circuit is adapted to selectively adjust its impedance to a high-impedance state when the input/output device is a non-signaling intermediate device.

13. The input/output device of claim 12, wherein the input/output driver circuit is adapted to selectively adjust its impedance to approximately half of the characteristic impedance of the multi-drop bus when the input/output device is a signaling intermediate device.

14. The input/output device of claim 12, wherein the input/output driver circuit is adapted to selectively adjust its impedance to approximately equal to the characteristic impedance of the multi-drop bus when the input/output device is an end-point device.

15. A method of reducing reflections from an input/output device coupled to a multi-drop bus at an intermediate location, the method comprising:

determining a status of the input/output device, wherein the status is selected from the group consisting of signaling and non-signaling; and adjusting an impedance of the input/output device to a high-impedance state when the input/output device is in a non-signaling status.

* * * * *